UNITED STATES PATENT OFFICE.

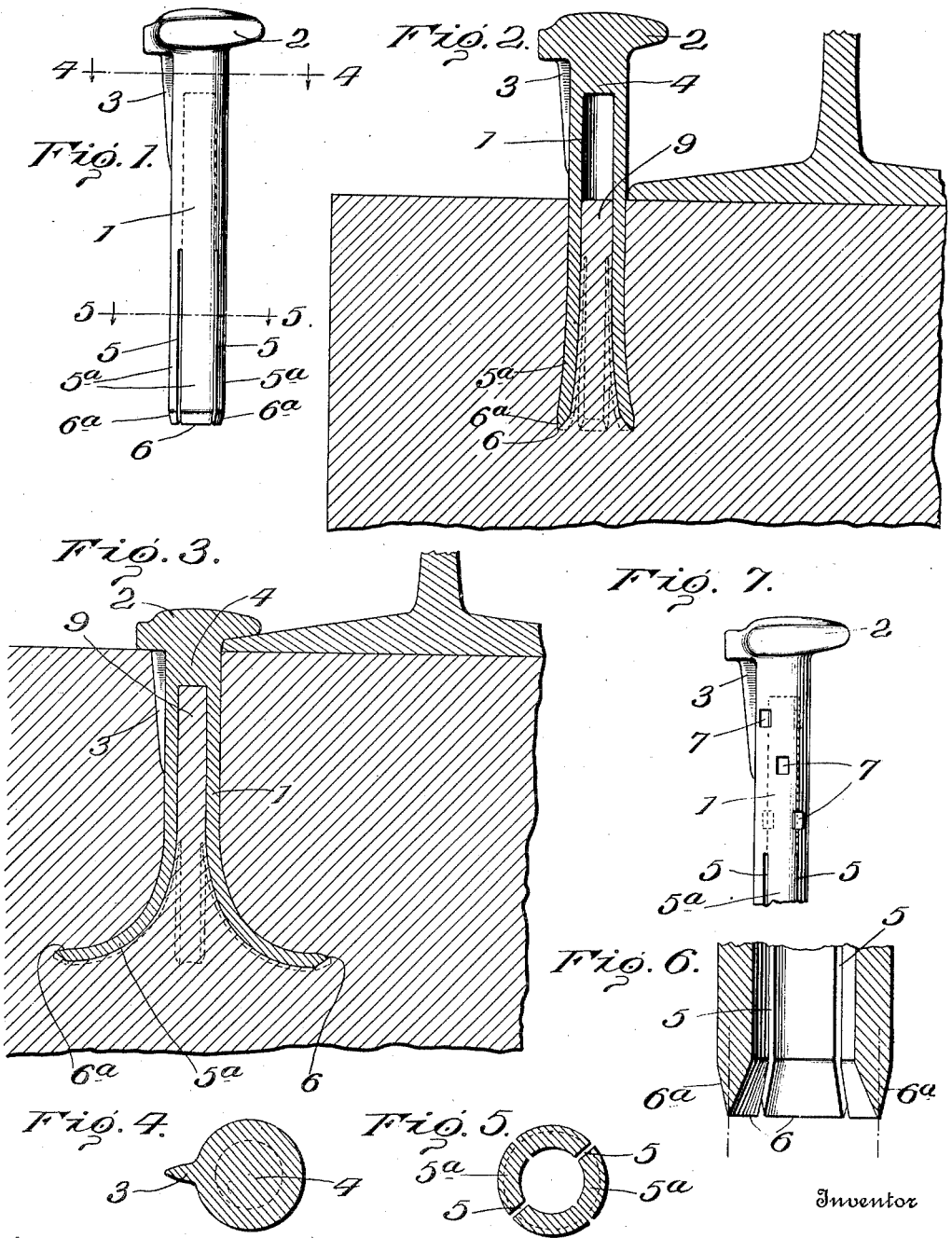

NATHAN ABRAMSON, OF WASHINGTON, DISTRICT OF COLUMBIA.

SPIKE.

1,108,483. Specification of Letters Patent. Patented Aug. 25, 1914.

Application filed July 25, 1913. Serial No. 781,155.

*To all whom it may concern:*

Be it known that I, NATHAN ABRAMSON, a subject of the King of Great Britain, but who have filed a declaration and received my first papers to become a citizen of the United States, residing at Washington, in the District of Columbia, have invented certain new and useful Improvements in Spikes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in spikes, primarily designed to be used in connection with railroad tracks.

The principal object of the invention is to provide a spike or fastener which, when driven into a tie, will offer great resistance to its withdrawal by the track.

A further object of the invention is to provide means for causing the wood to deflect the holding prongs, and to assist in increasing the grip of the spike in the wood, when the former is finally driven in place.

My invention also contemplates improvements in the details of construction and arrangement of parts which will be hereinafter described and particularly pointed out in the claims.

Referring to the accompanying drawings: Figure 1 is a side elevation of my improved spike; Fig. 2 is a sectional view illustrating a spike partly driven into a tie, and the prongs just beginning to be deflected; Fig. 3 is also a sectional view illustrating the spike fully driven into a tie; Fig. 4 is a cross section on the line 4—4 of Fig. 1; Fig. 5 is a cross section on the line 5—5 of Fig. 1; Fig. 6 is an enlarged fragmentary view of the lower end of the spike to illustrate the cutting edges of the prongs; Fig. 7 is a view of a modified form of spike.

Referring to the drawings, 1 designates a tubular shank having a head 2, and a rib 3, the latter depending from the overhanging portion of the head, the rib being adapted to act as a brace between the head and the shank and also to prevent the spike rotating when driven into a tie. The upper portion of the shank 1, adjacent the head is solid, as indicated at 4, the solid portion extending a suitable distance below the head, and forms the top of or an abutment in the tubular portion. The lower end of the tubular portion of the shank is provided with a plurality of slits 5, to form a series of prongs $5^a$, the lower ends of which are sharpened to form cutting edges 6 to facilitate driving the spike in a tie. The outer lower ends of the prongs are beveled at $6^a$ to counteract somewhat the rapidly deflecting tendency of the prongs, and to regulate the point at which they begin to deflect, when driving the spike. This insures a steady and even deflection, and the angle of deflection may be varied by varying the angle of the inner or outer bevel.

In the modification in Fig. 7 I have shown the tubular part of the shank 1 provided with a series of openings 7 into which the wood enters after having been depressed by the solid part of the shank 4.

In operation the spike is driven into a tie and by reason of the tubular constructions compressed core 9 of wood is formed. The beveled and sharpened formation of the lower end of the shank will cause the latter to follow a straight line when first driven into the wood, but upon further driving the spike, the friction between the latter and the wood increases and the prongs commence to spread as shown in Fig. 2. Once the prongs start to deflect they spread rapidly and acutely as the spike is hammered into the tie, until they assume the position shown in Fig. 3. Before the spike is entirely driven into the tie, the solid portion 4 comes into contact with the core 9, and further compresses it, which results in the wood adjacent the prongs being forced outwardly against the same, which tends to assist in their deflection. This construction not only tends to deflect the prongs, but it also creates a binding action between the core and spike, which greatly increases the friction between the two elements, hence insures the spike obtaining a secure grip in the wood.

I am aware pronged spikes are old in the art, but my invention aims to provide means whereby in the driving of the spike, the core of wood will be compressed to effectively assist in spreading the prongs, and to offer increased frictional resistance between the spike and wood to prevent displacement by continued vibration of the parts.

What I claim is:

1. A spike comprising a head and a shank, the shank being solid for a substantial distance below the plane of the bottom of the head, said shank being hollow below the solid portion and provided at its lower end with slits to form a series of prongs, the bottom of the solid portion of the stem compressing the wood confined in the hollow portion which serves to spread the prongs and increase the friction between the spike and the wood.

2. A spike comprising a head and a shank, the shank being solid for a substantial distance below the plane of the bottom of the head, said shank being hollow below the solid portion, whereby when the spike is driven into a piece of wood, the bottom will compress the wood confined in the hollow portion and serve to increase the friction between the stem and the wood and to distort the lower end of the stem.

3. A spike comprising a head and a shank, the shank being solid for a substantial distance below the plane of the bottom of the head, said shank being hollow below the solid portion and provided at its lower end with slits to form a series of prongs, the lower ends of the prongs being sharpened on both sides, the bottom of the solid portion of the stem compressing the wood confined in the hollow portion which serves to spread the prongs and increase the friction between the spike and the wood.

4. A spike comprising a head and a shank, the shank being hollow for a portion of its length and open at the bottom, the closed portion extending below the plane of the bottom of the head, the shank having lateral openings connecting with the hollow portion.

In testimony whereof I have signed my name to this specification in the presence of two subscribing witnesses.

NATHAN ABRAMSON.

Witnesses:
  EMILY F. CAMP,
  W. A. WILLIAMS.